Nov. 18, 1947.   C. F. JENKINS ET AL   2,431,255
BRUSHHOLDER CROSS-CONNECTION
Filed Oct. 24, 1945
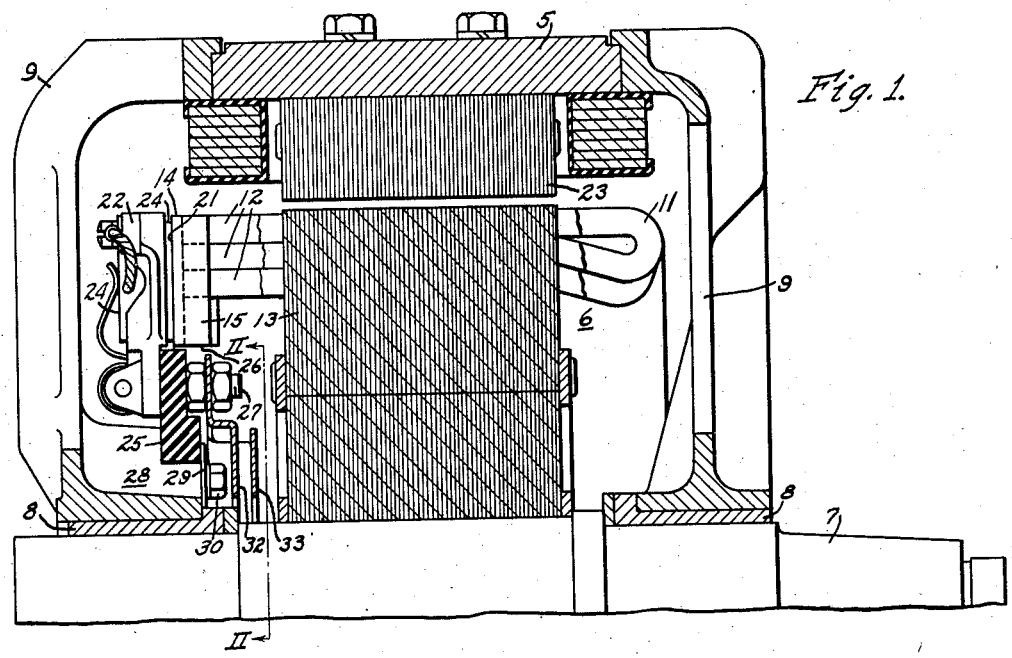
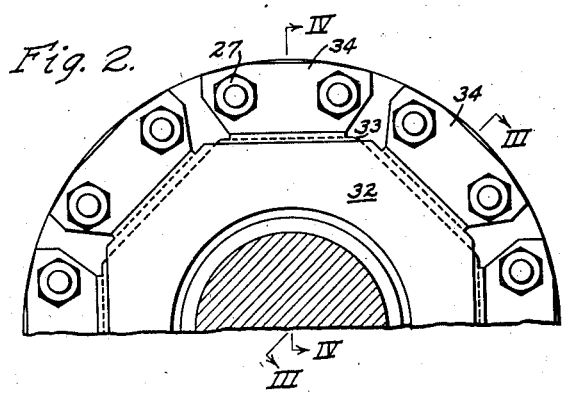
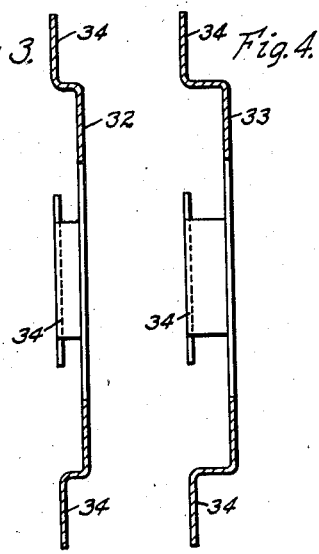
WITNESSES:
Leon M. Garman
INVENTORS
Charles F. Jenkins and
Rawdon E. Rambo.
BY
O. B. Buchanan
ATTORNEY Patented Nov. 18, 1947

2,431,255

UNITED STATES PATENT OFFICE 2,431,255

BRUSHHOLDER CROSS CONNECTION

Charles F. Jenkins, Laughlintown, and Rawdon E. Rambo, Pittsburgh, Pa., assignors to Westinghouse Electric Corporation, East Pittsburgh, Pa., a corporation of Pennsylvania Application October 24, 1945, Serial No. 624,286

8 Claims. (Cl. 171—323)

Our present invention relates to brushholder cross-connections for connecting a plurality of brushes of the same polarity, which are mounted on a common brushholder-supporting ring, in a dynamo-electric machine.

An object of our invention is to provide an extremely effective, light-weight, brushholder cross-connection, and particularly one which occupies space which would otherwise be vacant, so that no extra space is required in the machine for the brushholder cross-connections.

A more particular object of our invention is to provide our improved brushholder cross-connections in a dynamo-electric machine having a radial commutator at one end of the rotor-member, with the brushholder cross-connections disposed between the rotor-core and the brushholder-supporting ring.

Fig. 1 shows a longitudinal sectional view of the top half of a motor embodying our invention in an exemplary form;

Fig. 2 is an elevational view of the brushholder cross-connections, as seen on the section-plane indicated at II—II in Fig. 1; and Figs. 3 and 4 are transverse sectional views of the two brushholder cross-connection rings, as indicated by the section-planes III—III and IV—IV, respectively, in Fig. 2.

In Fig. 1, we show our invention as being embodied in a small direct-current motor having a field member 5 and an armature member 6, the latter being mounted on a shaft 7 which is supported in bearings 8 carried by end brackets 9 on the stator-frame. The armature or rotor member 6 has an armature winding 11 having a plurality of coil-ends 12 extending from the armature-core 13 at one end of the machine, the coil-ends 12 being disposed in such a manner as to constitute a radially disposed ring of coil-ends, spaced from the shaft. These coil-ends 12 are disposed in a plurality of layers, one radially above another. At the ends of these coil-ends 12, we provide a radial-commutator assembly 14, composed of a plurality of radially disposed segment-faced commutator-bars 15 which are secured to the several coil-ends, each bar being secured to a plurality of radially superposed coil ends.

Bearing against the radial front-surface 21 of the commutator, are a plurality of radially disposed brushholders 22 of a plurality of different polarities, there being a plurality of brushholders of each polarity. In a direct-current machine, as illustrated, there are only two polarities, namely the positive brushes and the negative brushes, and the number of brushholders is commonly the same as the number of poles 23 of the machine. Each brushholder 22 carries a brush 24 which bears against the radial commutator-surface 21.

The brushholders 22 are insulatingly supported by a single supporting-ring 25, which is disposed approximately in the annular space between the shaft 7 and the inner periphery 26 of the radial commutator 14, in spaced relation to the commutator. In the illustrated form of embodiment of our invention, the brushholder-supporting ring 25 is made of insulating material, and is bolted directly to the several brushholders 22, by bolts 27. The brushholder-supporting ring 25 is held on the hub 28 of the front-end bracket 9, by means of a washer 29 and bolts 30.

Since the commutator end-connections 12 necessarily extend out a certain distance from the commutator-core 13, there is thus an annular space between the brushholder-supporting ring 25 and the end of the rotor-member, and in this space, we dispose our brushholder cross-connections, which are in the form of two specially designed rings 32 and 33.

In accordance with our present invention, each cross-connection ring 32 and 33 is in the form of a washer-like annular member of sheet-copper or other good conductor, having a plurality of bent tabs 34. There are as many cross-connection rings 32, 33 as there are different polarities of the brushholders—namely two, in the case of a direct-current motor, as illustrated—and each cross-connection ring has as many bent tabs 34 as there are brushholders of that polarity. The tabs 34 extend from the outer peripheries of the respective rings 32 and 33, being bent first axially, that is, at right angles to the rings, and then radially outwardly, so as to make connection with the same bolts 27 which mount the respective brushholders 22 on the brushholder-supporting ring 25. The lengths of the bent tabs 34 of the different cross-connection rings 32 and 33 are different, so that the cross-connection rings 32 and 33 are spaced both from the brushholder-supporting ring 25 and from each other. The cross-connection rings 32 and 33 are thus held in parallel spaced relation to each other and to the brushholder-supporting ring 25, in the space which is already available between the brushholder-supporting ring 25 and the end of the rotor-member or rotor-core support.

From the foregoing description, it will be observed that our special cross-connection rings 32 and 33 achieve the utmost in simplicity of construction, lightness in weight, small space-requirements, and low electrical resistance.

We claim as our invention:

1. A brushholder assembly for a dynamo-electric machine, comprising a plurality of brushholders of the same polarity, insulating supporting-means for said brushholders, bolted connections between the several brushholders and their supporting-means, and a cross-connection ring having a plurality of tabs, one for each of said brushholders, said tabs being uninsulatedly secured to their respective brushholders by the same bolts which connect their respective brushholders to the supporting-means.

2. A brushholder assembly for a dynamo-electric machine, comprising a plurality of brushholders of a plurality of different polarities, there being a plurality of brushholders of each polarity, a supporting-ring for insulatingly supporting all of the brushholders, bolted connections between the several brushholders and the supporting-ring, and a plurality of cross-connection rings, one for each polarity, disposed in spaced relation to each other and to the supporting-ring, each cross-connection ring having a plurality of twice-bent tabs, one for each brushholder of its polarity, so as to bring the ends of the tabs in a plane spaced from the plane of the associated cross-connection ring, said tabs being uninsulatedly secured to their respective brushholders by the same bolts which connect their respective brushholders to the supporting-ring, the lengths of the tabs of the different cross-connection rings being different, so as to maintain the spacing of the cross-connection rings.

3. A dynamo-electric machine having a commutator-type rotor-member, a shaft for the rotor-member, a radial commutator disposed at one end of the rotor-member in spaced relation to the shaft, a single brushholder-supporting ring disposed approximately in the space between the shaft and the inner periphery of the radial commutator, in spaced relation to the latter, a plurality of radially disposed brushholders insulatedly supported on said brushholder-supporting ring in position to carry brushes bearing on said commutator, the brushholders being of a plurality of different polarities, there being a plurality of brushholders of each polarity, bolted connections between the several brushholders and the supporting-ring, and a plurality of cross-connection rings, one for each polarity, disposed in spaced relation to each other and to the supporting-ring, each cross-connection ring having a plurality of twice-bent tabs, one for each brushholder of its polarity, so as to bring the ends of the tabs in a plane spaced from the plane of the associated cross-connection ring, said tabs being uninsulatedly secured to their respective brushholders by the same bolts which connect their respective brushholders to the supporting-ring, the lengths of the tabs of the different cross-connection rings being different, so as to maintain the spacing of the cross-connection rings.

4. A dynamo-electric machine having a commutator-type rotor-member, a shaft for the rotor-member, a radial commutator spaced from one end of the rotor-member in spaced relation to the shaft, a single brushholder-supporting ring disposed approximately in the space between the shaft and the inner periphery of the radial commutator, in spaced relation to the latter, a plurality of radially disposed brushholders insulatedly supported on said brushholder-supporting ring in position to carry brushes bearing on said commutator, the brushholders being of a plurality of different polarities, there being a plurality of brushholders of each polarity, bolted connections between the several brushholders and the supporting-ring, and a plurality of cross-connection rings, one for each polarity, disposed in parallel spaced relation to each other in the space between the brushholder-supporting ring and the end of the rotor-member, each cross-connection ring having a plurality of twice-bent tabs, one for each brushholder of its polarity, so as to bring the ends of the tabs in a plane spaced from the plane of the associated cross-connection ring, said tabs being uninsulatedly secured to their respective brushholders by the same bolts which connect their respective brushholders to the supporting-ring, the lengths of the tabs of the different cross-connection rings being different, so as to maintain the spacing of the cross-connection rings.

5. A brushholder assembly for a dynamo-electric machine, comprising a plurality of brushholders of the same polarity, an insulating supporting-ring for said brushholders, bolted connections between the several brushholders and said insulating supporting ring, and a cross-connection ring having a plurality of tabs, one for each of said brushholders, said tabs being uninsulatedly secured to their respective brushholders by the same bolts which connect their respective brushholders to the supporting-means.

6. A brushholder assembly for a dynamo-electric machine, comprising a plurality of brushholders of a plurality of different polarities, there being a plurality of brushholders of each polarity, a supporting-ring for insulatingly supporting all of the brushholders, bolted connections between the several brushholders and the supporting-ring, and a plurality of cross-connection rings, one for each polarity, disposed in spaced relation to each other and to the supporting-ring, each cross-connection ring having a plurality of twice-bent tabs, one for each brushholder of its polarity, so as to bring the ends of the tabs in a plane spaced from the plane of the associated cross-connection ring, said tabs being uninsulatedly secured to their respective brushholders, the lengths of the tabs of the different cross-connection rings being different, so as to maintain the spacing of the cross-connection rings.

7. A dynamo-electric machine having a commutator-type rotor-member, a shaft for the rotor-member, a radial commutator disposed at one end of the rotor-member in spaced relation to the shaft, a single brushholder-supporting ring disposed approximately in the space between the shaft and the inner periphery of the radial commutator, in spaced relation to the latter, a plurality of radially disposed brushholders insulatedly supported on said brushholder-supporting ring in position to carry brushes bearing on said commutator, the brushholders being of a plurality of different polarities, there being a plurality of brushholders of each polarity, bolted connections between the several brushholders and the supporting-ring, and a plurality of cross-connection rings, one for each polarity, disposed in spaced relation to each other and to the supporting-ring, each cross-connection ring having a plurality of twice-bent tabs, one for each brushholder of its polarity, so as to bring the ends of the tabs in a plane spaced from the plane of the associated cross-connection ring, said tabs being uninsulatedly secured to their respective brushholders, the lengths of the tabs of the different cross-connection rings being different, so as to maintain the spacing of the cross-connection rings.

8. A dynamo-electric machine having a commutator-type rotor-member, a shaft for the rotor-member, a radial commutator spaced from one end of the rotor-member in spaced relation to the shaft, a single brushholder-supporting ring disposed approximately in the space between the shaft and the inner periphery of the radial commutator, in spaced relation to the latter, a plurality of radially disposed brushholders insulatedly supported on said brushholder-supporting ring in position to carry brushes bearing on said commutator, the brushholders being of a plurality of different polarities, there being a plurality of brushholders of each polarity, bolted connections between the several brushholders and the supporting-ring, and a plurality of cross-connection rings, one for each polarity, disposed in parallel spaced relation to each other in the space between the brushholder-supporting ring and the end of the rotor-member, each cross-connection ring having a plurality of twice-bent tabs, one for each brushholder of its polarity, so as to bring the ends of the tabs in a plane spaced from the plane of the associated cross-connection ring, said tabs being uninsulatedly secured to their respective brushholders, the lengths of the tabs of the different cross-connection rings being different, so as to maintain the spacing of the cross-connection rings.

CHARLES F. JENKINS.
RAWDON E. RAMBO.

REFERENCES CITED

The following references are of record in the file of this patent:

UNITED STATES PATENTS

| Number | Name | Date |
|---|---|---|
| 891,847 | Mattman | June 30, 1908 |
| 893,370 | Ralston | July 14, 1908 |
| 2,379,176 | Mulheim | June 26, 1945 |